(12) United States Patent
Shim

(10) Patent No.: US 9,847,694 B2
(45) Date of Patent: Dec. 19, 2017

(54) ROTOR OF MOTOR

(71) Applicant: LG INNOTEK CO., LTD., Seoul (KR)

(72) Inventor: Woo Seob Shim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 545 days.

(21) Appl. No.: 14/108,593

(22) Filed: Dec. 17, 2013

(65) Prior Publication Data

US 2014/0167541 A1     Jun. 19, 2014

(30) Foreign Application Priority Data

Dec. 17, 2012  (KR) .................. 10-2012-0147297

(51) Int. Cl.
| | | |
|---|---|---|
| *H02K 1/27* | (2006.01) | |
| *H02K 7/116* | (2006.01) | |
| *H02K 41/02* | (2006.01) | |
| *H02K 7/06* | (2006.01) | |

(52) U.S. Cl.
CPC ............ *H02K 7/116* (2013.01); *H02K 1/278* (2013.01); *H02K 7/063* (2013.01); *H02K 41/02* (2013.01)

(58) Field of Classification Search
CPC .... H02K 7/116; H02K 2/2776; H02K 2/2773; H02K 2/2726

USPC .......................................................... 310/80
See application file for complete search history.

(56) References Cited

U.S. PATENT DOCUMENTS

| | | | | |
|---|---|---|---|---|
| 4,381,747 | A * | 5/1983 | Kobayashi | ............ F02D 31/004 |
| | | | | 123/179.16 |
| 4,501,981 | A * | 2/1985 | Hansen | ..................... H01F 7/08 |
| | | | | 310/209 |
| 4,588,913 | A * | 5/1986 | Adami | ..................... H02K 7/06 |
| | | | | 310/49.22 |
| 5,718,259 | A * | 2/1998 | Miyake | ................... F16K 31/04 |
| | | | | 137/338 |
| 7,389,709 | B2 * | 6/2008 | Zhou | ................... F16H 25/2204 |
| | | | | 74/424.81 |
| 9,099,905 | B2 * | 8/2015 | Manz | ................... H02K 1/2773 |
| 2011/0203396 | A1 * | 8/2011 | Hyun | ................... H02K 1/2733 |
| | | | | 74/116 |

FOREIGN PATENT DOCUMENTS

| | | |
|---|---|---|
| EP | 1 598 526 | 11/2005 |
| WO | WO 2011/048581 | 4/2011 |

* cited by examiner

*Primary Examiner* — Hanh Nguyen
*Assistant Examiner* — Leda Pham
(74) *Attorney, Agent, or Firm* — Ked & Associates, LLP

(57) ABSTRACT

A rotor of a motor capable of simplifying a manufacturing process and improving precision. The rotor includes a screw type of ball spindle, and a nut spindle that surrounds the ball spindle, is screwed onto the ball spindle, and has magnets attached to an outer circumferential surface thereof.

7 Claims, 3 Drawing Sheets

ROTOR OF MOTOR

CROSS-REFERENCE TO RELATED APPLICATION

This application claims priority to and the benefit of Korean Patent Application No. 10-2012-0147297, filed on Dec. 17, 2012, the disclosure of which is incorporated herein by reference in its entirety.

BACKGROUND

1. Field

The present application relates to a motor having a rotor and a stator and, more particularly, to a rotor of a motor.

2. Background

Motors used for a transmission include an interior permanent magnet (IPM) motor, a surface permanent magnet (SPM) motor, and so on.

The IPM motor is a motor in which a magnet is buried in a rotor. The SPM motor is a motor in which a part of a magnet is disposed to be exposed through a surface of a rotor. A screw type of rotor may be used for the SPM motor.

The screw type of rotor generally includes a ball spindle that is a rotational shaft, a tube, a nut spindle that is installed in the tube so as to support the tube and is screwed onto the ball spindle, a core installed outside the tube so as to attach a magnet, and the magnet attached to the core.

In this way, many parts including the tube, the nut spindle, and the core are separately provided and assembled.

For this reason, processes of assembling these parts are required. As a result, a manufacturing process is complicated. Further, a tolerance is accumulated with assembly of each part, reducing overall precision.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
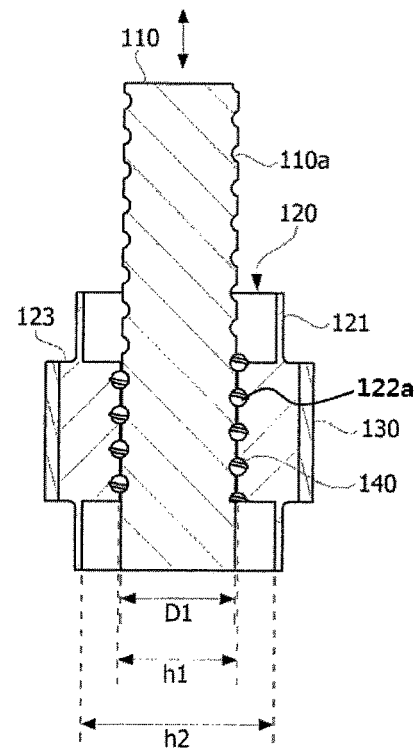
FIG. 1 is a cross-sectional view showing a rotor of a motor according to an embodiment of the present application.

Hereinafter, exemplary embodiments of the present application will be described in detail. However, the present application can be implemented in various forms, and embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the application.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will also be understood that when a component such as a layer, a film, a region, or a plate is referred to as being "on" another component, the component may be "directly on" the other component, or intervening components may be present. In contrast, when a component may be "directly on" another component, no intervening components may be present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

Unless otherwise defined, all terms used herein, including technical or scientific terms, have the same meanings as those generally understood by those with ordinary knowledge in the field of art to which the application belongs. Such terms as those defined in a generally used dictionary are to be interpreted to have the meanings equal to the contextual meanings in the relevant field of art, and are not to be interpreted to have ideal or excessively formal meanings unless clearly defined in the present application With reference to the appended drawings, exemplary embodiments of the present application will be described in detail below. To aid in understanding the present application, like numbers refer to like elements throughout the description of the figures, and the description of the same elements will be not reiterated.

FIG. 1 is a cross-sectional view showing a rotor of a motor according to an embodiment of the present application.

Referring to FIG. 1, a rotor of a motor according to an embodiment of the present application includes a ball spindle 110 and a nut spindle 120.

The ball spindle 110 is a screw type of rotational shaft, and includes threads on an outer circumferential surface thereof. The nut spindle 120 is screwed onto the ball spindle 110, and has magnets 130 attached to an outer circumferential surface thereof. Therefore, when the nut spindle 120 rotates, the ball spindle 110 moves linearly.

Figure 2:
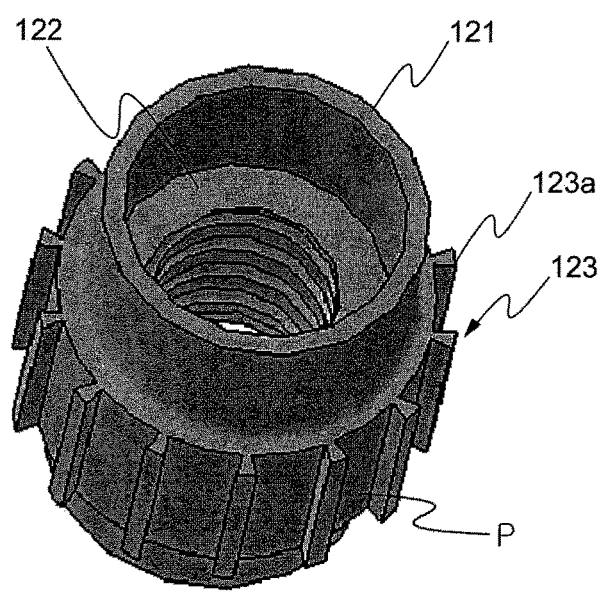
FIG. 2 is a perspective view of a nut spindle.
Figure 3:
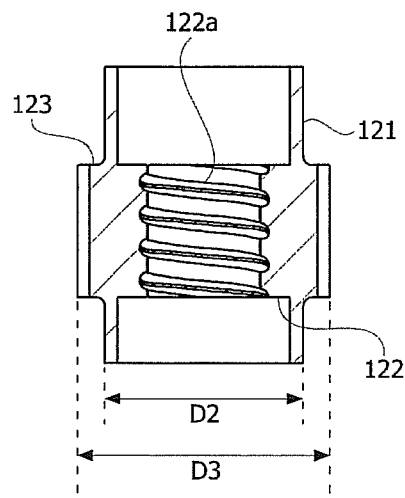
FIG. 3 is a cross-sectional view of the nut spindle.

FIG. 2 is a perspective view of the nut spindle 120, and FIG. 3 is a cross-sectional view of the nut spindle 120.

Hereinafter, a structure of the nut spindle 120 will be described with reference to FIGS. 1, 2 and 3.

The nut spindle 120 includes supports 121 and a core 123. The core 123 is provided with a first through-hole h1 through which the ball spindle 110 passes in a lengthwise direction, and second threads 122a on an inner circumferential surface of the first through-hole h1 so as to correspond to first threads 110a of the ball spindle 110. In detail, balls 140 are inserted between the threads 122a formed inside the core 123 and the threads 110a of the ball spindle.

The supports 121 protrude to opposite sides of the core 123, and have second through-holes h2 through which the ball spindle 110 passes. A diameter of the first through-hole h1 is greater than a diameter D1 of the ball spindle and is smaller than a diameter of the second through-hole h2.

Referring to FIG. 2, the core 123 is provided with a plurality of protrusions 123a that radially protrude from an outer circumferential surface thereof. The protrusions 123a are formed in an axial direction of the ball spindle 110 in a bar shape.

The protrusions 123a are disposed in parallel along the outer circumferential surface of the core 123, and the magnets 130 are fixedly inserted into pockets P formed between the neighboring protrusions 123a. Here, the magnets 130 may be fixed after being inserted into the pockets P using a separate mold coating (not shown). As a method of attaching the magnets 130 to the core 123, a typical method using a resin may be applied.

In one embodiment, each protrusion 123a may be formed in such a manner that a width thereof is increased in proportion to a distance from the outer circumferential surface of the core 123. With this configuration, the magnets are not be separated from the core when the motor is rotated at a high speed, so that it is possible to prevent slip torque.

Further, as in FIG. 3, a thickness of the core 123 is greater than that of each support 121, and an outer diameter D3 of the core 123 is greater than that D2 of each support 121. With this configuration, functions which three parts (a tube, a nut spindle, and a core) perform in a conventional rotor are implemented by the integrated nut spindle 120. Thereby, the number of parts is reduced from three to one. Therefore, a time required in the related art to assemble the tube, the nut spindle, and the core is reduced, so that a manufacturing process can be simplified.

Moreover, a tolerance is accumulated in each process of assembling the tube, the nut spindle, and the core of the related art, thus increasing the finally accumulated tolerance and reducing precision. However, in the embodiment of the present application, due to the integrated configuration, such an accumulated tolerance does not take place. Accordingly, precision of the motor is improved, and there is no risk of defects caused by the tolerance.

Figure 4:
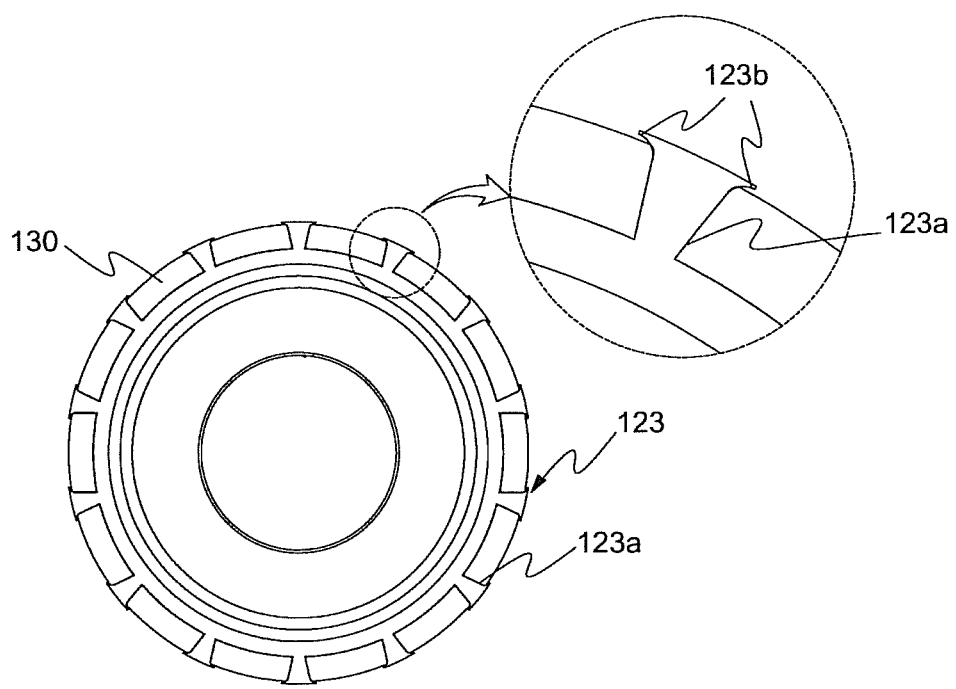
FIG. 4 shows another embodiment of a protrusion.

FIG. 4 shows another embodiment of the protrusions 123a.

In the embodiment of FIG. 4, each protrusion 123a may be provided with wings 123b, each of which protrudes from an end thereof toward the neighboring protrusion. The wings 123b may be continuously or discontinuously formed in a lengthwise direction of the protrusion 123a, and function to prevent separation of the magnet 130 disposed between the protrusions 123a.

Figure 5:
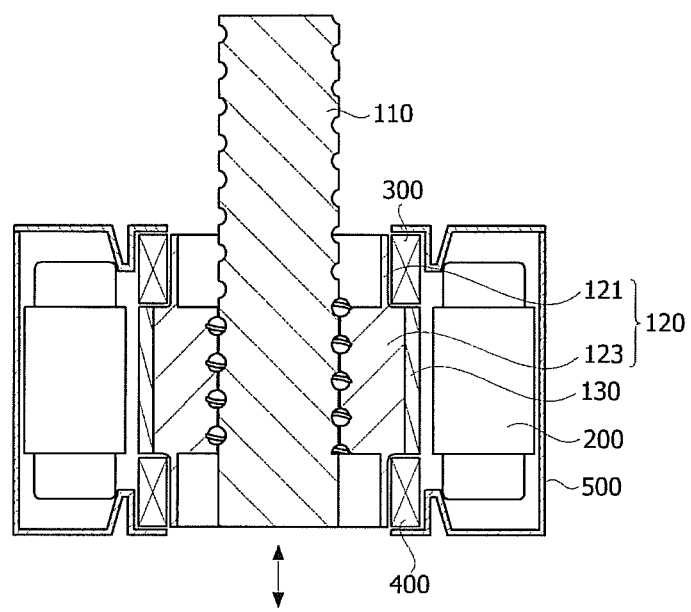
FIG. 5 is a conceptual view of the motor according to the embodiment of the present application.

FIG. 5 is a conceptual view of the motor according to the embodiment of the present application.

The motor according to the present application includes a housing 500, a stator 200 and a nut spindle 120 that are disposed in the housing 500, and a ball spindle 110 moving linearly when the nut spindle 120 is rotated.

The housing 500 has a space in which the stator 200 and the nut spindle 120 are housed. The stator 200 is housed in the housing 500. Further, the nut spindle 120 is disposed to be rotatable relative to the stator 200. A configuration of the nut spindle 120 is identical to the foregoing, and detailed description thereof will be omitted.

Accordingly, when the nut spindle 120 is rotated by an electromagnetic interaction between the stator 200 and the magnets 130 of the nut spindle 120, the ball spindle 110 screwed onto the nut spindle 120 moves linearly. In this case, opposite ends of the ball spindle 110 are supported by bearings 300 and 400.

This type of motor can be applied to various fields. For example, the motor may be applied to a brake system. The ball spindle 110 moving linearly by driving of the motor pressurizes a master cylinder (not shown) of the brake system.

Thereby, the brake system can be operated. Under the same principle, the motor may be applied to a transmission.

The present application is directed to providing a rotor of a motor capable of simplifying a manufacturing process and improving precision.

According to an aspect of the present application, there is provided a rotor of a motor, which includes: a screw type of ball spindle; and a nut spindle that surrounds the ball spindle, is screwed onto the ball spindle, and has magnets attached to an outer circumferential surface thereof.

The nut spindle includes a core having a first through-hole through which the ball spindle passes, and supports disposed on opposite sides of the core and having second through-holes larger than the first through-hole. The core has pockets which are formed in an outer circumferential surface thereof and in which the magnets are mounted Here, the core may include a plurality of protrusions formed in an axial direction of the ball spindle, and the magnets may be attached between the protrusions.

Here, the protrusions may be disposed in parallel along the outer circumferential surface of the core.

Further, each protrusion may be configured so that a lower portion thereof has a smaller width than an upper portion thereof.

Further, each protrusion may include wings, each of which protrudes from the top thereof toward the neighboring protrusion, and which prevent separation of the magnet.

In addition, the wings may be continuously or discontinuously formed in a lengthwise direction of each protrusion.

According to the present application, a tube, a nut spindle, and a core of a conventional rotor are integrally formed. Thereby, the number of parts is reduced, so that it is possible to simplify a manufacturing process.

Further, according to the present application, due to the integrated configuration, a tolerance is not accumulated in an assembling process. As such, overall precision of the motor is improved. Accordingly, a defect rate is remarkably reduced in a manufacturing process, and a yield is improved.

Any reference in this specification to "one embodiment," "an embodiment," "example embodiment," etc., means that a particular feature, structure, or characteristic described in connection with the embodiment is included in at least one embodiment of the application. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor comprising:
   a housing;
   a stator disposed in the housing;
   a nut spindle disposed to be rotatable relative to the stator; and
   a ball spindle that is coupled to the nut spindle and that moves linearly when the nut spindle is rotated,
   wherein the nut spindle includes:
      a core having a first through-hole through which the ball spindle passes and pockets in which magnets are mounted,
      a first support disposed on a first side of the core and supported by a first bearing,
      a second support disposed on a second side of the core and supported by a second bearing, and
      wherein the first support has a second through-hole larger than the first through-hole of the core, and the second support has a second through-hole larger than the first through-hole of the core,
      wherein a diameter of the second through-hole of the second support is same as a diameter of the second through-hole of the first support,
      wherein a height of the magnet in an axial direction is less than a height from the first support to the second support in the axial direction, wherein the height of the magnet corresponds to a height of the core in the axial direction,
      wherein an outer circumferential surface of the first support is supported by the first bearing, and an outer circumferential surface of the second support is supported by the second bearing,
      wherein the pockets include a plurality of protrusions disposed on an outer circumferential surface of the core in a bar shape,
      wherein the outer circumferential surface of the core and the plurality of protrusions protrude more than the first support and the second support in a radial direction,
      wherein the first support, the second support, and the plurality of protrusions are integrally formed with the core.

2. The motor of claim 1, wherein the protrusions have a width increased in proportion to a distance from the outer circumferential surface of the core, wherein each protrusion has wings, and each of the wings protrudes to a neighboring protrusion.

3. The motor of claim 2, wherein the wings are continuously or discontinuously formed in a lengthwise direction of each protrusion.

4. The motor of claim 1, wherein the first through-hole of the core has threads that are formed on an inner circumferential surface thereof and are screwed onto the ball spindle.

5. The motor of claim 1, wherein the first through-hole of the core has a diameter that is greater than that of the ball spindle, and is smaller than that of each of the second through-holes.

6. The motor of claim 1, wherein the core has a greater thickness than each support.

7. The motor of claim 1, wherein a size of the first bearing is same as a size of the second bearing.

* * * * *